(12) United States Patent
Chambers et al.

(10) Patent No.: US 6,580,461 B2
(45) Date of Patent: *Jun. 17, 2003

(54) LINE-QUADRUPLER IN HOME THEATER USES LINE-DOUBLER OF AV-PART AND SCALER IN GRAPHICS CONTROLLER OF PC-PART

(75) Inventors: Paul Chambers, San Jose, CA (US); Christopher D. Coley, Morgan Hill, CA (US); Marshall Williams, Fremont, CA (US); Jeroen Heuvelman, Campbell, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 10/077,264

(22) Filed: Feb. 13, 2002

(65) Prior Publication Data

US 2002/0080270 A1 Jun. 27, 2002

Related U.S. Application Data

(63) Continuation of application No. 08/941,151, filed on Sep. 30, 1997.

(51) Int. Cl.⁷ .................... H04N 11/20; H04N 7/01; H04N 9/74; H04N 5/44; G06T 11/00
(52) U.S. Cl. .................... 348/458; 348/448; 348/449; 348/562; 348/581; 345/472; 345/800; 345/815
(58) Field of Search ................ 348/458, 441, 348/445, 446, 448, 581, 459, 449, 561, 562, 552, 911; 345/660, 667–668, 472, 800, 815, 472.1, 472.2

(56) References Cited

U.S. PATENT DOCUMENTS

| | | | | |
|---|---|---|---|---|
| 4,641,188 A | * | 2/1987 | Dischert | 348/448 |
| 4,876,596 A | * | 10/1989 | Faroudja | 348/450 |
| 4,967,271 A | * | 10/1990 | Campbell et al. | 348/701 |
| 4,989,090 A | * | 1/1991 | Campbell et al. | 348/451 |
| 5,159,451 A | * | 10/1992 | Faroudja et al. | 348/448 |
| 5,347,314 A | * | 9/1994 | Faroudja et al. | 348/448 |
| 5,596,371 A | * | 1/1997 | Pakhchyan et al. | 348/452 |
| 5,739,867 A | * | 4/1998 | Eglit | 348/581 |
| 6,002,446 A | * | 12/1999 | Eglit | 348/581 |
| 6,115,507 A | * | 9/2000 | Eglit et al. | 382/300 |
| 6,222,589 B1 | * | 4/2001 | Faroudja et al. | 348/448 |

* cited by examiner

Primary Examiner—John Miller
Assistant Examiner—Paulos Natnael
(74) Attorney, Agent, or Firm—Gwenaelle Le Pennec

(57) ABSTRACT

A home theater comprises a video processing sub-system and a PC capable of controlling the sub-system. The sub-system has a de-interlacer/line doubler and the PC has a graphics controller with scaling capability. The combination of the line doubler and the scaler is made to function as a line quadrupler.

13 Claims, 4 Drawing Sheets

LINE-QUADRUPLER IN HOME THEATER USES LINE-DOUBLER OF AV-PART AND SCALER IN GRAPHICS CONTROLLER OF PC-PART

CROSS REFERENCE TO RELATED APPLICATIONS

This is a divisional of application Ser. No. 08/941,151, filed September 30, 1997.

FIELD OF THE INVENTION

The invention relates to an information processing system with a sub-system for processing video data. The invention relates in particular, but not exclusively, to home theater equipment. The invention also relates to an electronic circuit with a video line multiplication device, and to a method of multiplying video lines.

BACKGROUND ART

A home entertainment system is equipment intended for the domestic environment and capable of processing in a synergetic manner audio, video and graphics information that is being supplied by a variety of information sources. An example of a home entertainment system is the Destination D5-200 computer of Gateway 2000. See, for example, the article "Gateway 2000: Destination D5-200", Bruce Brown, PC Magazine edition of May 6, 1997. This computer has all its user-control functionalities, regarding information-content selection, bundled in software applications run on a single operating system.

Computer video and television video can be achieved through scanning the phosphors of a CRT with an electron beam. The beam begins at the top left of the CRT and scans horizontal lines from left to right across the screen, illuminating pixel after pixel in the process. When the beam reaches the bottom right of the screen, it has completed a field in case of interlaced video or a frame in case of non-interlaced video. The conventional TV standards such as NTSC and PAL were established to create images that are acceptable when viewed from a distance of about five times the picture height on relatively small displays. These standards have also been taken into account in the format of movies stored on a laser disc (e.g., PAL, NTSC) or on a DVD (e.g., MPEG2 ML/MP).

OBJECT OF THE INVENTION

Home theater equipment typically is used with high-end display devices: large display screens, such as those of front-end or rear-end projection TV's or high-resolution displays such as those used with PC's. Conventional processing of digital video in the well established video formats cause severe degradation of the perceived image quality when viewed on large or high-resolution displays. One of the undesired results is the visibility of the line structure.

A solution to the problem of the undesired visibility of the line structure on a large screen or on a high-resolution screen is to use digital video processing techniques to increase the number of lines that make up the image. Separate line multiplication equipment is commercially available but is rather expensive, ranging from the $2,000 (e.g., the Lancia of Extron Electronics) to the $34,000 (Snell & Wilcox).

It is an object of the invention to achieve line multiplying of professional or near-professional quality in a home theater of the type specified in the preamble, but at a substantially lower cost.

SUMMARY OF THE INVENTION

To this end, the invention provides an information processing system comprising a video sub-system with a line multiplication device for processing video data, and comprising a graphics controller with a scaler. The line multiplication device is coupled to the graphics controller for achieving further line multiplying via the scaler.

In the preferred embodiment, the system of the invention is a home theater comprising a synergetic combination of video data processing equipment and a PC. In the preferred embodiment, the video sub-system has a de-interlacer/line doubler chip, e.g., the gmVLD8 DICE Video Line Doubler of Genesis Microchip, Inc., to process digital interlaced video input data, and the PC has a graphics controller, e.g., a 3DImage975 of Trident Microsystems, Inc., for generating graphics data. The graphics controller has a scaling capability. As known a scaler can control vertical underscan or overscan by multiplying pixels or interpolating between pixels. A video data path involving the de-interlacer/line doubler and the scaler in cascade provides line quadrupling of a near-professional quality.

BRIEF DESCRIPTION OF THE DRAWINGS

The invention is explained by way of example and with reference to the accompanying drawings, wherein.

PREFERRED EMBODIMENTS

System Block Diagram

Figure 1:
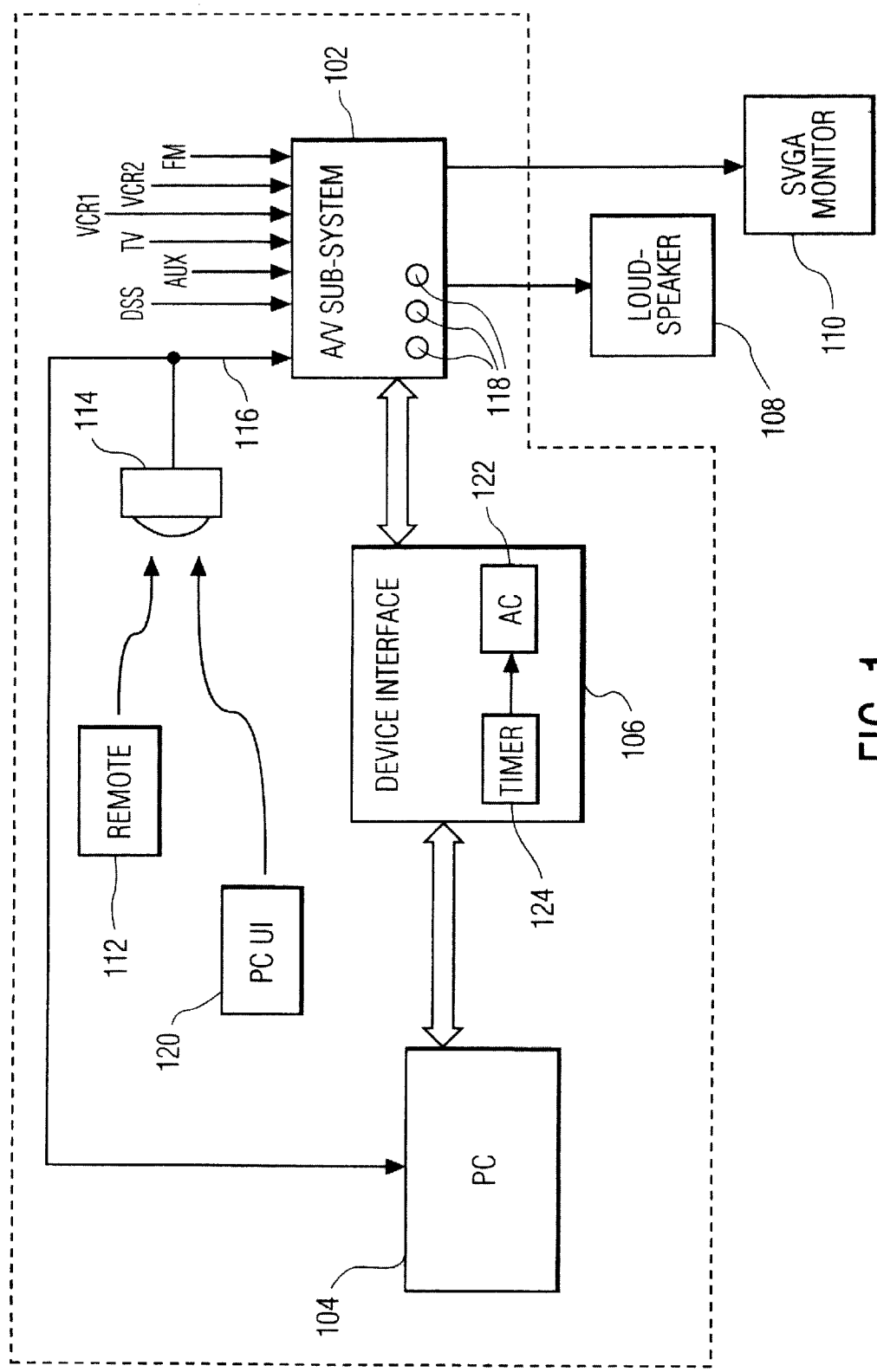
FIG. 1 is a block diagram of a system of the invention.

FIG. 1 is a functional block diagram of a data processing system 100 of the invention. System 100 comprises an AV-sub-system 102 with audio and video functionalities, a controlling device 104, in this example a PC, and a device interface 106 interconnecting subsystem 102 and PC 104.

Sub-system 102 comprises, for example, the following devices (not shown): a DVD drive, a TV-tuner, an FM-tuner, and an audio pre-amplifier with Dolby® Digital, and Dolby® Pro Logic capabilities ("Dolby" is a trademark of Dolby Laboratories). Sub-system 102 has inputs for receipt of signals from various sources (not shown): DSS (Digital Satellite System), cable TV, first and second videocassette recorders VCR1 and VCR2, radio FM, etc., and outputs for connection to loudspeakers 108 and to an SVGA monitor 110. AV-sub-system 102 provides direct and instantaneous user-control over the audio and video functionalities through, e.g., the combination of a remote control device 112 and an infra-red eye 114 that has a connection 116 to sub-system 102, or through front keys 118.

PC 104 provides control of the audio and video functionalities of AV-sub-system 102 via software applications including, e.g., a sophisticated GUI for source selection, processing of the VBI and of other AV-services, settings of the audio and video functionalities such as selection of brightness and contrast, and selection of audio modes (monaural, stereophonic or surround), video games, Internet access, and software upgrades for the processors (not shown) in future versions of AV-sub-system 102. PC 104 may be provided with software applications to combine video and audio content supplied by multiple content information sources DSS, VCR1, VCR2, TV, FM with computer-generated graphics and sounds.

System 100 has a user-interface 120 that comprises, for example, a wireless keyboard and a wireless mouse for communication with PC 104 via IR-eye 114. Remote 112 and UI 120 use different IR-communication protocols or different command sets. Monitor 110 supplies visual feedback to the user when interface 120 is being manipulated.

Device-interface 106 lets PC 104 control AV-sub-system 102 and lets sub-system 102 notify PC 104 of various events in sub-system 102 that are relevant to the software applications running on PC 104. Also, interface 106 passes on the IR commands sent by UI 120 and received by IR eye 114 connected to sub-system 102. Interface 106 comprises a microcontroller 122 that monitors the status of sub-system 102 and notifies PC 104 of any status changes. For example, when the user adjusts the sound volume through remote 112, microcontroller 122 senses the status change and passes this adjustment on to PC 104. When the user thereupon retrieves the sophisticated GUI for display on monitor 110, the adjusted setting of the volume has been processed and the status displayed conforms with the most recent user-interaction either via remote 112 or user-interface 120.

Device interface 106 monitors the heart beat of PC 104. PC 104 sends a data stream to sub-system 102 wherein periodically a special command occurs. The sole purpose of this command is to notify the system of the fact that PC 104 is still running. The special command is commonly referred to as "heart beat". Typically, a heart beat is sent once every second. Device interface 106 has a fail safe timer 124. Upon receipt of a heart beat, timer 124 is reset. The timer expires after, say, 2 seconds, which is substantially longer than the time period between two successive heart beats. When PC 104 stalls, device interface 106 stops receiving the heart beat, and timer 124 expires. This confirms that PC 104 has become inert and is not capable of controlling sub-system 102. Now, sub-system 102 continues to provide audio and video services, but independently of PC 104 and with a simplified conventional on-screen display. For example, upon a crash of PC 104 or during a reboot, the user keeps interacting with sub-system 102 via remote 112 as with any other conventional system in order to change TV channels or audio sources, or in order to change the monitor input from TV to VCR.

Video/Graphics Data Path

Figure 2:
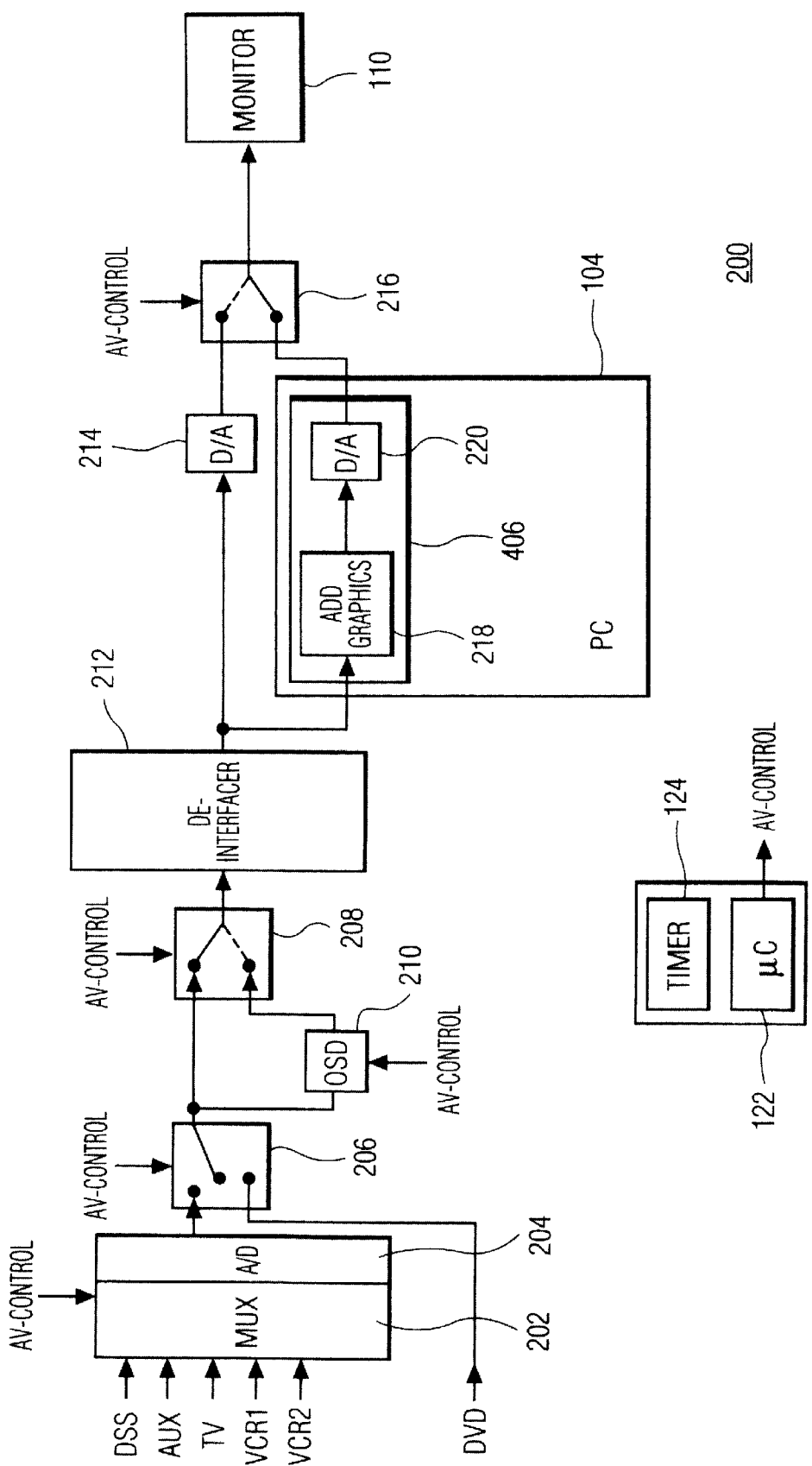
FIGS. 2 and 3 are block diagrams of the video/graphics data path in different embodiments of the system of the invention.

FIG. 2 is a functional block diagram of a first embodiment of a video/graphics data path 200 from various sources to monitor 110. Path 200 is controlled by both sub-system 102 and PC 104. Path 200 comprises a multiplexer MUX 202 that has inputs for receipt of analog signals DSS, AUX, TV, VCR1, and VCR2, for example. MUX 202 has an output connected to an AD-converter 204. The output of AD-converter 204 is connected to one input of first switch 206, the other input of which receives the digital signals from a DVD. Switch 206 is controlled by remote 112 via microcontroller 122. The output of switch 206 is connected directly to one input of a second switch 208. The output of switch 206 is also coupled to the other input of switch 208 via an OSD device 210 that takes care of simple on-screen display features. Switch 208 and OSD device 210 are controlled through remote 112. The output of switch 208 goes to a de-interlacer 212. As known, video sources typically transmit fields of odd lines and fields of even lines alternately so that the lines have to be reordered (or: de-interlaced) at the receiving end. The output of de-interlacer 212 is coupled via a DA-converter 214 to one input of a third switch 216. The output of de-interlacer 212 is also coupled to the other input of switch 216 via a circuit 218 for adding graphics to the output signal of de-interlacer 212 under control of PC 104, and another DA-converter 220. The output of switch 216 goes to SVGA monitor 110. In this example, components 202–220 are integrated within sub-system 102, but it is clear that other configurations are possible, e.g., one wherein some of the components 202–220 are accommodated in device interface 106. Circuit 218 and D/A converter 220 are, in the preferred embodiment, included in a graphics controller 406 that is further discussed with reference to FIG. 4.

As mentioned above, system 100 has a fail safe timer 124 that expires when PC 104 stops sending its heart beat. If fail safe timer 124 expires, microcontroller 122 sets switches 208 and 216 in the positions indicated by the dotted line. In this case, data path 200 still lets OSD device 210 control the on-screen display of simple messages in a conventional manner, as opposed to the full graphics supplied under a GUI software application run on PC 104. Note that graphics circuit 218 has been shunted in this case. In essence, what remains is the conventional data path for consumer electronics equipment. Alternatively, if fail safe timer 124 expires microcontroller 122 sends a request to PC 104 to check if PC 104 is responsive. If PC 104 does not respond, controller 122 sets switches 208 and 216 as discussed above. If PC 104 responds timer 124 is reset. This approach provides an additional safety check so as not to set switches 208 and 216 prematurely.

Figure 3:
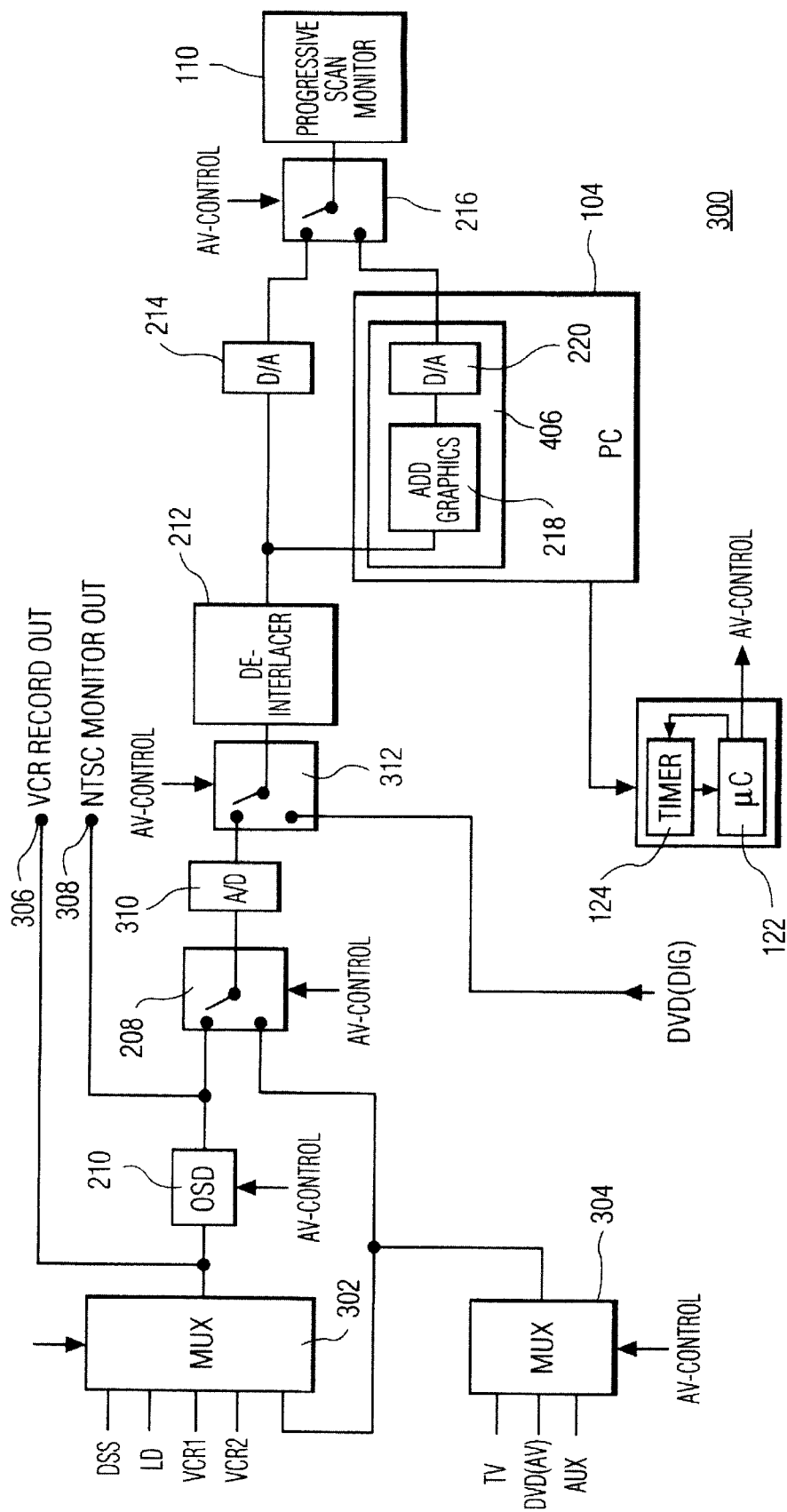

FIG. 3 is a functional block diagram of a second embodiment of a video/graphics data path 300 from various sources to monitor 110. The differences with respect to embodiment 200 relate mainly to the different input signals. Path 300 has a multiplexer 302 receiving analog signals DSS, VCR1, VCR2 (discussed above), an analog input signal LD (laser disc) and an analog signal from the output of a multiplexer 304. Multiplexer 304 receives input signals TV and AUX (discussed above) and the analog video signal stemming from a DVD signal passed through an D/A converter (not shown). Both multiplexers 302 and 304 are controlled via microcontroller 122. The output of multiplexer 302 is connected to an output node 306 for connection to a record input of a VCR. The output is also connected to OSD 210. The output of OSD 210 is connected to a node 308 for connection to an input of a standard NTSC monitor. The output of OSD 210 and the output of multiplexer 304 are both connected to switch 208, whose output is coupled to de-interlacer 212 via an AD converter 310. PC 104 supplies a heart beat to timer 124. For example, the heart beat rate depends on the mode of operation of PC 104. PC 104 notifies controller 122 of a change to another mode so that controller 122 programs timer 124 to expire after different time periods appropriate for different heart beat rates. In another example, PC 104 notifies controller 122 of going into a sleep mode wherein the heart beat is suspended. Absence of the heart beat then is not an indication of PC 104 having crashed, and timer 124 is reset and frozen. Upon awakening, PC 104 notifies controller 122, which then unfreezes timer 124, and the heart beat supply is resumed. A switch 312 between A/D converter 310 and de-interlacer 212 selects between the output of A/D converter 310 and the digital DVD output. Switch 312 corresponds to switch 206 in system 200.

The remainder of path 300 is similar to path 200 apart from that the output of switch 216 is connected to an input of progressive scan monitor 110. Another name for a non-interlaced picture is 'progressive' scan. Removing interlace reduces visible line structure. It has the same perceived effect as doubling the number of lines. Non-interlaced pictures look considerably more solid and stable. With interlacing, fine details that correspond to only one line are presented at half field rate, i.e., they are seen to line flicker. If the detail is distributed among two lines it appears to jump up and down. This is referred to as line twitter. Progressive scan also produces a slightly brighter image: each line of phosphor is being refreshed at twice the conventional frequency so that the luminescence between two refresh events does not decay as far as in the case of interlaced image generation.

Circuit 218 and D/A converter 220 are, in the preferred embodiment, included in a graphics controller 406 that is further discussed with reference to FIG. 4.

Sub-system 102 and device-interface 106 are shown as separate blocks in the diagram of FIG. 1. Note that device interface 106 can also, at least partly, be physically integrated with sub-system 102. Similarly, IR-eye 114 can be integrated within either sub-system 102 or with device interface 106.

The information of co-pending U.S. patent application Ser. No. 08/880,387, "SLAVE DSP REBOOTS STALLED MASTER CPU" is herewith incorporated by reference. This co-pending patent application discusses a home theater that comprises one or more slave processors, e.g., DSP's, for processing specific tasks, and a master processor, e.g., a CPU, for control of the system. The slave processor is capable of rebooting the master processor if the master processor has stalled. This slave-controlled rebooting avoids manual cold rebooting of the system and is particularly advantageous in open-architecture multimedia systems with asynchronously cooperating components.

Video Data Path

Figure 4:
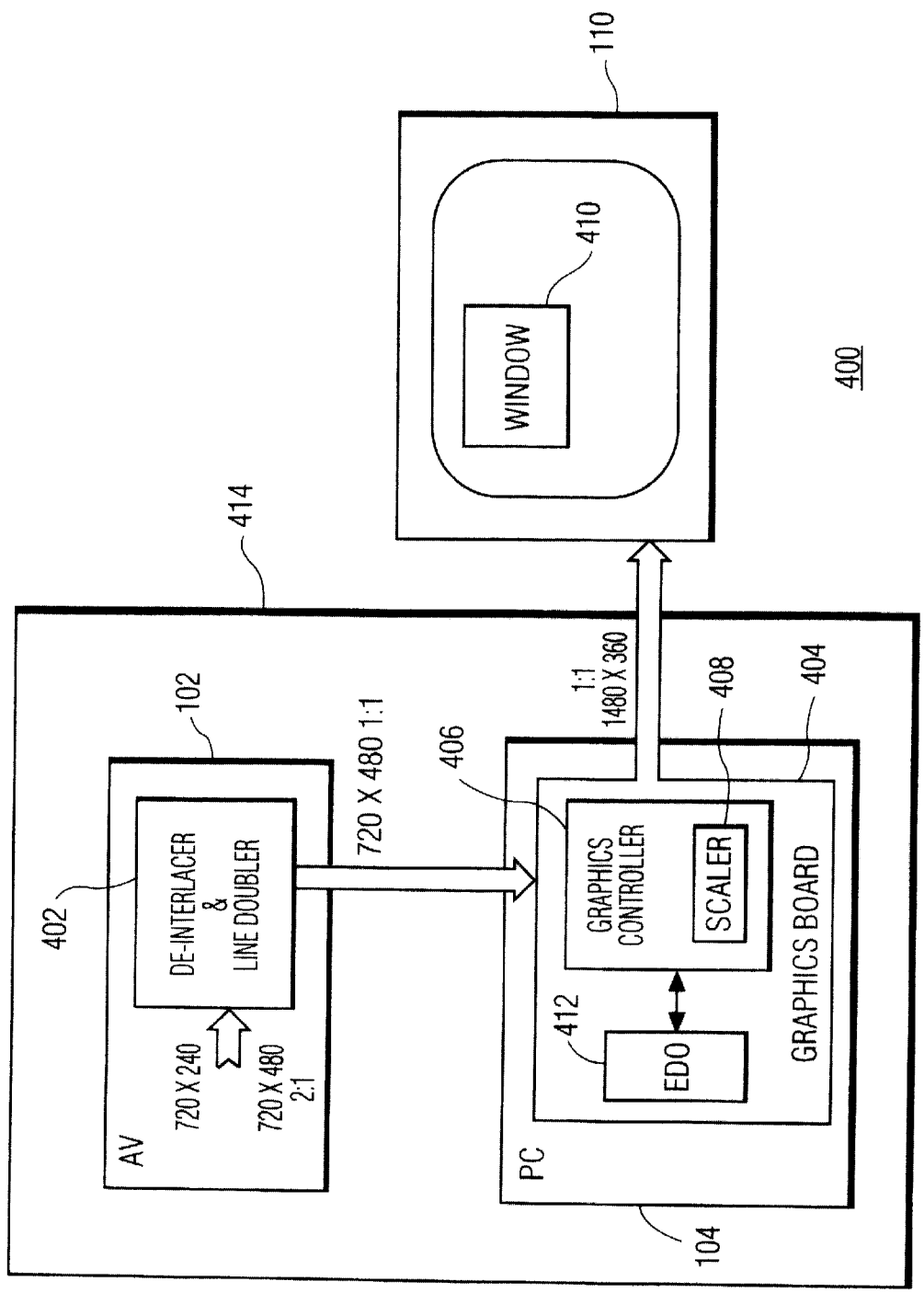
FIG. 4 is a diagram of a configuration of the video path in the invention Throughout the figures, same reference numerals indicate similar or corresponding features.

FIG. 4 is a block diagram of system 100 illustrating details of a specific configuration 400 of the digital video data path.

AV sub-system 102 is coupled to a VGA or SVGA monitor 110. AV-subsystem 102 functionally comprises and controls a de-interlacer/line doubler circuit 402. Circuit 402 comprises, for example, a "gmVLD8 DICE Video Line Doubler" of Genesis Microchip, Inc. The "gmVLD8" is a commercially available de-interlacer/line doubler that converts interlaced video for display on non-interlaced systems (e.g., VGA computer screens). Circuit 402 receives interlaced video data as 720×240 fields (240 lines of 720 pixels) and outputs a complete 720×480 de-interlaced scan (480 lines with 720 pixels each). These numbers are for illustration only and relate to the visible lines for NTSC that uses the 858×525 interlaced format, i.e., the CCIR601 standard. Note that 720×480 numbers relate to the active frame area, and that the 858×525 numbers relate to the total area, including, e.g., the horizontal and vertical blanking. An output of circuit 402 is coupled to a graphics board 404 in PC 104. Graphics board 404 comprises a graphics controller 406. Controller 406 comprises, for example, a 3DImage975 of Trident Microsystems, Inc. The 3DImage975 is a commercially available 3D-accelerator that includes a scaler 408. Scaler 408 is used to control vertical underscan or overscan for TV display. That is, scaler 408 serves to stretch or squeeze the video data so that it fits into a window 410 on the screen of display 110. Although window 410 is shown to occupy only a small portion of the screen, it is programmable to cover substantially all of the screen. Typical NTSC TV's are capable of displaying about 420 horizontal lines on screen, so graphics display modes of more than 420 lines need to be scaled down, and graphics display modes of less than 420 lines need to be scaled up for correct aspect ratios. Horizontal scaling is achieved through proper pixel clock timing. The vertical scaling in the 3DImage975 is software controllable thus allowing the image to be scaled flexibly.

Graphics board 404 accommodates display memory 412 that, in the current example, comprises 4 MB of EDO (Extended Data-Out) DRAM. Extended Data-Out allows the memory controller to begin a new column address instruction while it is reading data at the current address. The content of memory 412 represents the content of window 410.

Graphics board 404 supplies video output data in a 1440×960 format (960 lines of 1440 pixels) de-interlaced or 720×960 interlaced. The 3DImage975 is programmable in order to supply interlaced or de-interlaced video output data. Interlaced output reduces required bandwidth. A simple manner to implement the interlaced output is to shift either the odd or the even fields by a half a single line, thus displaying the same field twice. This may introduce some line flicker, but this is acceptably little because of the now finer line structure.

In the example of the home entertainment shown in FIG. 4, AV-subsystem 102 and PC 104 are mounted on a single board 414 that is combined with a DVD player (not shown) within a single housing (not shown) in order to provide a powerful yet compact piece of equipment. With reference to FIGS. 2 and 3, note that graphics controller 406 can be bypassed so that de-interleaver/line doubler 402 supplies data directly to monitor 110. This is a great advantage in case PC crashes: the user is then still capable of receiving video.

What is claimed is:

1. An electronic system for processing video data and comprising:
    a line multiplication device that is configured to increase a number of lines in the video data, and
    a graphics controller, operable substantially independent from the line multiplication device, that is configured to further process an output of the line multiplication device based on a display's characteristics, and
    coupling means configured to enable bypassing the graphics controller for enabling further passing the output of the line multiplication device to a display.

2. The system of claim 1, wherein the system is further configured to selectively provide an output from either the line multiplication device or the graphics controller.

3. The system of claim 1, wherein the graphics controller is comprised in a personal computer providing a periodical heart beat signal and the coupling means further comprises:
    a timer for receiving the heart beat signal and the timer controls the coupling means to cause to bypass the graphics controller in dependence upon a conditional reception of the heart beat signal.

4. The system of claim 1, wherein the line multiplication device has an output coupled to an input of the graphics controller.

5. The system of claim 1, wherein die line multiplication device has an input for receiving interlaced video input data and an output for supplying de-interlaced video output data.

6. The system of claim 1, wherein the graphics controller is controllable to supply interlaced video output data.

7. The system of claim 6, wherein the graphics controller is controllable to supply the interlaced video output data by vertically shifting a same field.

8. The system of claim 1, wherein the line multiplication device comprises a line doubler.

9. A method of processing video data, the method comprising the following steps:
    multiplying lines of the video data in a vertical direction through processing by a video line multiplication device;

selectively further processing a resulting output of the multiplying step through processing by a scaler of a graphics controller that is operable substantially independent of the video line multiplication device; and enabling bypassing the processing step for further passing the resulting output to a display.

10. The method of claim 9, wherein the multiplying of the lines and the processing respectively comprise a doubling of the lines, thereby providing a quadrupling of the lines of the video data.

11. The method of claim 9, wherein the multiplying step comprises dc-interlacing the video data to produce de-interlaced video data, thereby doubling the lines of video data.

12. The method of claim 11, wherein the processing further comprises selectively scaling the dc-interlaced data by a factor of two, thereby providing the quadrupling of the lines of video data, wherein the selective sealing and the de-interlacing are substantially independent of each other.

13. An electronic device for processing video data and comprising:

a graphics controller configured to further process the video data, in which a number of lines was previously increased by a line multiplication device, the graphics controller being operable substantially independent from the line multiplication device; and coupling means configured to enable to bypass the graphics controller for further enabling to pass an output of the line multiplication device to a device.

* * * * *